Figure 1:
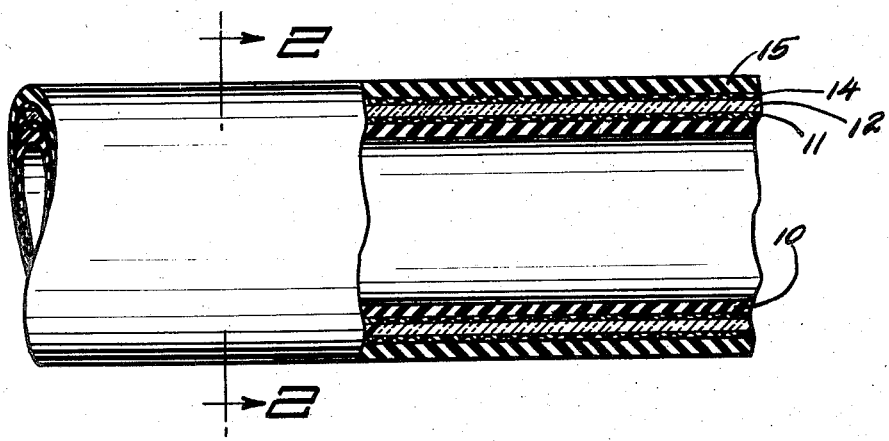

Oct. 14, 1958     J. R. RITCHIE ET AL     2,855,975

METHOD OF MAKING A FLEXIBLE HOSE

Filed March 18, 1954

INVENTOR.
JOHN R. RITCHIE
JOHN R. RITCHIE JR.
By Chas. C. Reif

2,855,975
METHOD OF MAKING A FLEXIBLE HOSE

John R. Ritchie and John R. Ritchie, Jr.,
Minneapolis, Minn.

Application March 18, 1954, Serial No. 417,084

6 Claims. (Cl. 154—8)

This invention relates to a flexible hose impervious to many substances and the method of making said hose.

Flexible hoses are now used in great numbers in many arts. Among said arts is the art of refrigeration. A liquid known as Freon is commonly used as a refrigerant fluid. The only one plastic that has been found which is for all practical purposes impervious to Freon is polyvinyl alcohol, now commonly called PVA. A hose containing a core of polyvinyl alcohol has the unfortunate characteristic that it is water soluble. People who have been using the said hose for refrigeration systems have had trouble with their hose of polyvinyl alcohol. There is present in such systems a small amount of moisture. This moisture acts to dissolve some of the polyvinyl alcohol and the same then passes into the dryer and coats parts of the same, making it quite ineffective and inefficient.

The only other flexible hose used in refrigeration systems in any great numbers is a flexible metal hose. This latter hose is satisfactory in some installations but it has objections in others, particularly on portable installations, such as trucks or automobiles. Said metal hose is quite expensive compared to the one made of polyvinyl alcohol.

It is an object of the invention to produce a flexible hose which is impervious to water, moisture and air and also to organic solvents including Freon, alcohol, oils and acids contained therein.

It is another object of this invention to produce a flexible hose having a layer of polyvinyl alcohol and also having one or more layers for protecting the layer of polyvinyl alcohol from water, moisture or air.

It is a further object of this invention to provide a novel method of making a hose impervious to water or moisture and also impervious to organic solvents, alcohol, oils and the acids therein.

It is another object of this invention to produce a hose and novel method of making the same, which hose is impervious to many organic solvents, alcohol, oils and the acids therein or formed thereby.

It is further an object of this invention to provide a novel method of forming a hose, which consists in surrounding a flexible tube, such as a tube of rubber or rubber composition with a layer of polyvinyl alcohol, in a novel way and then adding successive layers of fabric and rubber respectively.

It is still another object of this invention to provide a method of making an impervious flexible hose, which consists in surrounding a flexible waterproof tube with a heated mixture of polyvinyl alcohol, water and preferably glycerin, drying said product and then applying a layer of fabric and an outer layer of waterproof material.

It is more specifically an object of the invention to provide a method of making a flexible impervious tube as above set forth, which consists in surrounding a flexible tube of waterproof material, such as rubber, with a fabric covering, heating a mixture of polyvinyl alcohol and water and also preferably glycerin to a temperature of from 250 to 350 degrees F., applying this heated mixture to said fabric coating to form a layer, drying the hose at this stage, then surrounding said layer with a second fabric coating, and then surrounding said second fabric coating with an outer layer, such as rubber.

Figure 2:
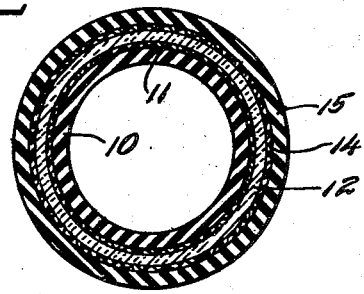
Figure 3:
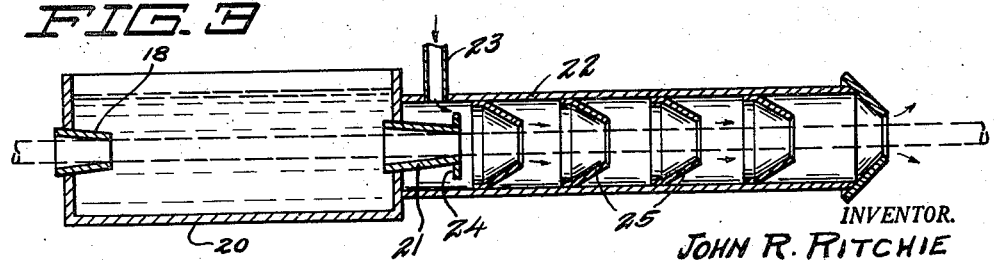

These and other objects will be fully set forth in the following description made in connection with the accompanying drawings in which Fig. 1 is a partial view of the hose, the same being partly in side elevation and partly in central vertical section;

Fig. 2 is a vertical section taken on line 2—2 of Fig. 1, as indicated by the arrows, and Fig. 3 is a diagrammatic view of an apparatus used in carrying out the method.

In carrying out the method of this invention, a flexible tube 10 of waterproof material is covered with a fabric coating 11. While the fabric used may be woven from various materials, such as the natural and artificial fibers now available, the fabric should be pervious to certain liquids. After the tube is covered with said fabric a heated mixture of polyvinyl alcohol and water is applied thereto to cover said fabric layer with said mixture and to form a coating 12 of said mixture on said fabric layer. While the ingredients of said mixture and the proportions thereof may vary, in practice a mixture of one part polyvinyl alcohol, two parts water and one part glycerine has been found very satisfactory. Said mixture has in practice been heated to a temperature running from 250 to 350 degrees F. Polyvinyl alcohol is now made in somewhat different forms. The one used in practice has been that known in commerce as Elvanol and particularly the one known as No. 71–30 Elvanol. While the heated mixture could be applied in various ways, so far in practice the fabric covered tube is moved through said heated mixture. It may be desirable to use thickening agents for the mixture to eliminate the chance of run-off or loss of the mixture in the dryer. Such thickening agents would also make the material somewhat easier to handle. Other materials than glycerin might be used which would facilitate the drying operation. The PVA mixture is kept heated and the tube with one layer of braid thereon is passed through the mixture. The tube is preferably moved through a cone-like member 18 into the vessel 20 which contains the PVA mixture. The thickness of the layer is determined by the tube being drawn through a cone-like member 21 at one side of the vessel 20. The most satisfactory results have been had by making the member 21 of soft material. It is necessary to have the PVA layer dry as quickly as possible so that the second layer of braid will not cut through said layer. While said layer may be dried in various ways, one way used in practice is to direct air against said tube as it emerges from member 21. A tube or elongated cylindrical member 22 extends from vessel 20 into which member 21 projects. Air is introduced through a pipe 23. To direct the air to all sides of the tube being treated, a baffle 24 is placed on the end of member 21. A plurality of spaced conical baffles 25 are placed in member 22 and these act to direct the air against the coated tube or hose. As many of the baffles 25 are used as found necessary.

To prevent the second layer of braid from cutting into or squeezing the PVA layer, a film or calendered strip is sometimes wrapped around said layer. Care must be taken to have the edges of said strip overlap. Such a film or strip may be made of PVA, such as a form known as 71–05. This can be made into a calendered strip. A film or strip of plastic material could also be used.

After the PVA layer has dried and hardened, the second layer 14 of braid is placed thereover. This is done on a braiding machine. The tension on the strands in braiding must be small, preferably from 1 to 3 pounds. While various fabrics could be used, in practice a layer of rayon braid has been found very satisfactory.

The hose thus produced is then surrounded with an outer layer or coating 15 of waterproof material. While various waterproof materials might be used, including some plastics, in practice a low temperature synthetic rubber, such as neoprene, has been found satisfactory. Said outer layer may be put on by extrusion, blown on, or put on as a formed tube. Said layer will be properly cured in any of the methods now used in the art. The outer layer seals the layer of polyvinyl alcohol from water, moisture, air, etc., so that there will be no deterioration thereof. Another important function of the outer waterproof layer is to prevent hardening or cracking of the layer of polyvinyl alcohol. As shown on the drawings, the outer layer is preferably of greater thickness than the inner layer.

From the above description it will thus be seen that a flexible hose has been produced which is impervious to water, moisture and air, and also to organic solvents, alcohol, oils and acids contained therein. The advantage of the tube of polyvinyl alcohol is secured and the waterproof layers at each side of said polyvinyl alcohol assure that no moisture can reach the same. The hose has been subjected to long and severe tests and has been found to give very satisfactory results. A novel flexible impervious hose and the method of making the same is thus provided. The hose is made without expensive apparatus. The problem encountered with the use of a tube of polyvinyl alcohol in refrigeration systems has thus been overcome.

As stated, the hose has been amply demonstrated in actual practice and found to be very successful and efficient.

It will of course be understood that various changes may be made in the form, details, arrangements and proportions of the device and in the steps and sequence of steps of the method without departing from the scope of applicants' invention, which, generally stated, consists in a method and device capable of carrying out the objects above set forth, such as disclosed and defined in the appended claims.

What is claimed is:

1. The method of making a flexible tube impervious to water, moisture and air and to organic solvents, alcohol, oils and acids contained therein, which consists in surrounding a flexible rubber tube with a pervious fabric covering, heating a mixture of one part polyvinyl alcohol and two parts water to a temperature of from 250 to 350 degrees F., impregnating and coating said fabric covering with said heated mixture, drying said applied mixture, applying another fabric covering and then applying an outer coating of synthetic rubber.

2. The method of making a flexible hose which consists in surrounding a flexible waterproof tube with a pervious fabric covering, heating a mixture of one part polyvinyl alcohol, known in the trade as Elvanol, two parts water and one part glycerin to a temperature of from 250 to 350 degrees F., applying said mixture to said covering to permeate and coat the same to form a layer thereon, drying said mixture and surrounding said layer with a layer of waterproof material.

3. The method of making a flexible hose which consists in surrounding a flexible tube of rubber with a pervious fabric covering, heating a mixture of polyvinyl alcohol, water and glycerin to a temperature of from 250 to 350 degrees F., applying said heated mixture to said fabric covering to coat the same, applying a second fabric covering to said hose, and then applying a coating of waterproof material to said last mentioned fabric covering.

4. The method set forth in claim 3, said last mentioned material being neoprene.

5. The method of making a flexible hose which consists in surrounding a flexible waterproof tube with a layer of fabric, then moving said tube through a heated polyvinyl alcohol solution for coating and impregnating said fabric with said solution, drawing said tube through a cone of soft material to size said coating, drying said coating, placing a layer of fabric over said coating and placing a layer of flexible waterproof material over said last mentioned layer of fabric.

6. The method of making a flexible hose, which consists in surrounding a flexible waterproof tube with a pervious fabric covering, heating a mixture of polyvinyl alcohol, water and glycerin to a temperature of from 250° F. to 350° F., applying said heated mixture to said covering to permeate and coat the same to form a layer thereon, drying said mixture and surrounding said layer with a layer of waterproof material.

References Cited in the file of this patent

UNITED STATES PATENTS

| | | |
|---|---|---|
| 2,053,112 | Schnabel | Sept. 1, 1936 |
| 2,312,853 | Toland et al. | Mar. 2, 1943 |
| 2,478,940 | Pape | Aug. 16, 1949 |
| 2,564,602 | Hurst | Aug. 14, 1951 |
| 2,602,959 | Fenlin | July 15, 1952 |
| 2,652,093 | Burton | Sept. 15, 1953 |
| 2,676,127 | Hansen | Apr. 20, 1954 |

FOREIGN PATENTS

| | | |
|---|---|---|
| 429,766 | Great Britain | June 6, 1935 |